No. 734,965. PATENTED JULY 28, 1903.
J. SCHINNELLER.
CONSTRUCTION OF ORDNANCE.
APPLICATION FILED NOV. 16, 1900.
NO MODEL.
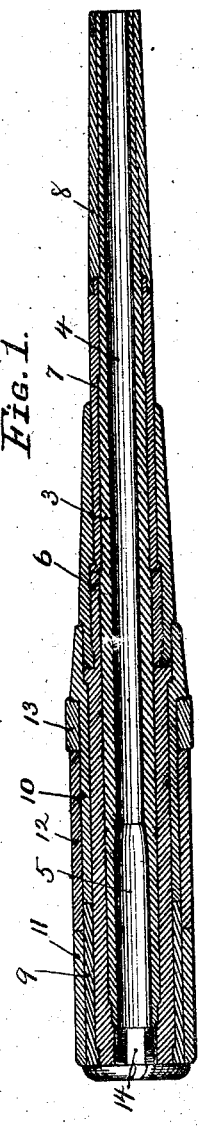
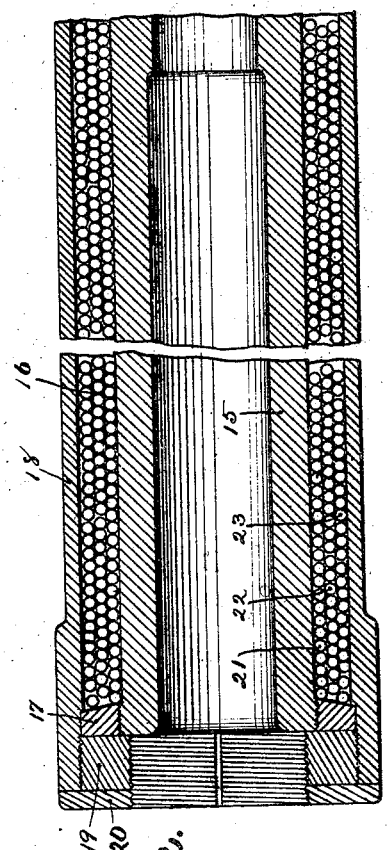
Witnesses:
Inventor:

No. 734,965. Patented July 28, 1903.

UNITED STATES PATENT OFFICE.

JACOB SCHINNELLER, OF PITTSBURG, PENNSYLVANIA.

CONSTRUCTION OF ORDNANCE.

SPECIFICATION forming part of Letters Patent No. 734,965, dated July 28, 1903.

Application filed November 16, 1900. Serial No. 36,701. (No model.)

*To all whom it may concern:*

Be it known that I, JACOB SCHINNELLER, a resident of Pittsburg, in the county of Allegheny and State of Pennsylvania, have invented a new and useful Improvement in Construction of Ordnance; and I do hereby declare the following to be a full, clear, and exact description thereof.

My invention relates especially to the construction of ordnance, although it is also adapted for cylinders which are subjected to great internal pressure, such as hydraulic, gas, and similar cylinders.

It is well known that when cylinders are subjected to a central force or internal pressure the tangential stress upon its inside and outside circumferences due to such force or pressure will not be anywhere near the same, and especially so if the walls of the cylinder are thick in proportion to its bore. Cylinders having thick walls, especially ordnance, are usually made of steel, which is more or less elastic, or, more strictly speaking, has the property or ability of elongating under stress to an appreciable degree, so that when the pressure comes on the walls of the cylinder they will expand. Barlow, of England, has shown that the stress produced on any material comprising the walls of a cylinder by the action of a central force or internal pressure, such as the explosion of powder in a gun or fluid-pressure in cylinders, diminishes as the square of the distance from the center increases. His demonstration is based upon the hypothesis that the area of the cross-section of the body to which the force is applied, such as the walls of the gun or cylinder, does not vary during the application of the force. If, therefore, we suppose the thickness of the walls of the cylinder to be divided into thin concentric rings, it is easy to see that the circumference of the outside ring will be longer than the inside one. Thus if the thickness of the walls is equal to one-half the diameter of the bore the outside ring will have twice the length of the inside one, and consequently if the metal composing said rings has the same tensile strength in all and if longitudinal stress, reduction of cross-area, and temperature are disregarded for each pound internal pressure per square inch the inside ring will elongate circumferentially about four times as much per unit of length as the outside one. In other words, the outside ring being twice the length of the inside ring has a capability of elongation under a given strain per square inch of section of twice the elongation of the inside ring, but obviously as the expansion of the external ring is only in proportion to the stress exerted thereon, which varies inversely as the square of the distance from the center, it follows that it will be elongated per unit of length only one-fourth as much as the inner ring. As a consequence of the several rings the outside one will offer the least resistance to the internal pressure in the inside ring, and the nearer the bore we get the greater the stress per square inch of section, the inside ring being subject to the greatest stress per square inch of section. It follows, therefore, that the inside ring will be strained the most and that the breaking down of the gun or cylinder will commence on the inside. In the construction of ordnance it has been attempted to meet this difficulty by so constructing the gun that an equal amount of stress will fall upon each of the layers composing the walls or shell of the gun. This end has been sought to be attained by building up the gun of a central tube upon which is shrunk a series of jackets or hoops. The jackets and hoops are made a little less in interior diameter than the exterior diameter of the tube or cylinder which they are to embrace, and in order to put them in place they are heated until their diameter becomes large enough to slip over the tube or cylinder. After being slipped upon the tube or cylinder they are allowed to shrink thereupon, and this shrinkage is such that it slightly diminishes the bore of the tube to such an extent that a final finishing reaming of the bore is necessary in order to bring it to the proper caliber. This indicates that a tremendous strain is exerted by the hoops upon the tube, so that the tube is in compression while the jackets and hoops are in tension. Consequently when the gun is discharged the initial compression of the tube must be equalized before tension can take place in it. This construction I believe to be based upon a faulty principle. Steel or other metal has elasticity within certain limits, beyond which it cannot be elongated without receiving a permanent strain or set, and if the elongation is continued beyond this the limit of the tensile strength of the metal may be reached and the same become ruptured. In ordnance as at present constructed the inner tube, and possibly the inner jacket or jackets also, is under an initial compression, as above stated. Consequently the stress of the exploding powder is not resisted by the inner tube or inner jacket until its compression is neutralized; but the stress is immediately transferred to and resisted by the jacket and hoops, and the stress on each layer is less and less as the number and thickness of the layers composing the walls of the gun are increased. The jacket and hoops or some of them, however, are under an enormous initial tensile stress by reason of having been shrunk on the tube and on each other, as above stated. Consequently the amount of additional stress which they can bear before reaching their elastic limit is very much reduced. In order, therefore, for the jackets and hoops to withstand the stress of the exploding powder, as well as the enormous initial stress to which they are subjected, and still be within their safety limit, it is necessary that they be constructed of a considerable thickness of metal, a much greater thickness than would be required by the stress of the exploding powder alone.

It is the object of my invention to overcome the objections above noted; and to this end it consists in constructing such guns or cylinders of a series of rings or layers which are secured one over the other by shrinking or forcing the outer ones on the inner ones, but only to such a degree that the jacket and hoops are subject to only sufficient tension to hold them securely in place and are not subject to such tension as will materially affect their power of resisting internal stress and in making said rings or layers of metal such that the property or ability of elongation of the metal composing said rings or layers decreases from the interior of the cylinder to the outside thereof or from the inner tube to the outer one or making said rings or layers of metal having the same property or ability of elongation, but the tensile strength whereof increases in each ring from the inside one out.

I have illustrated my invention in connection with ordnance.

In the accompanying drawings, Figure 1 is a longitudinal section through a modern coast-defense gun, showing the method of construction; and Fig. 2 is a similar view of a wire-wound gun.

The coast-defense gun (illustrated in Fig. 1) comprises the inner tube 3, in which is formed the bore 4 and the powder-chamber 5. Surrounding this tube is the jacket 6, which extends about one-half of the length of the tube at the breech end thereof. Also surrounding the tube 3 in front of the jacket is the chase-hoop 7, and surrounding the forward or muzzle end of the tube is the hoop 8. Outside of the jacket 6 are the two hoops 9 and 10, and outside of these are the hoops 11 and 12 and the trunnion-band 13. The gun will of course be provided with the ordinary breech-block 14; but this forms no part of my invention.

The wire-wound gun (illustrated in Fig. 2) is provided with a core-tube 15, in which is formed the bore and powder-chamber, as above described. This core-tube is wound with a series of layers 16, of wire, three such layers being shown in the drawings; but obviously the number thereof may vary, as desired. These layers are confined at their ends by suitable means—as, for instance, by the nut 17—and outside of these layers the gun is provided with the trunnion-jacket 18. At the breech it is provided with the bushing 19 and face-plate 20, which are provided with the opening for receiving the breech-block.

The various layers of the gun shown in Fig. 1 are made of suitable steel having the property or ability of elongation in varying degrees. For instance, the core-tube 3 may have a certain degree of ability or property of elongation—that is, under a given stress per square inch of surface it will elongate a certain amount per unit of length. The jacket 6 will possess the property or ability of elongation in a lesser degree—that is, under the same stress per square inch of surface it will elongate a less amount per unit of length than the core-tube 3. In the same manner the hoops 9 and 10 possess the property or ability of elongation in a still lesser degree than the jacket, while the hoops 11 and 12 will have a still less ability of elongation than the hoops 9 and 10. The jacket 6 and the various hoops will be fitted snugly over the core-tube 3 and over each other, so that they will be held firmly in place, but with only sufficient initial tension to hold them in place. The result is a built-up gun the various layers of which are fitted firmly upon each other, but not so firmly that the outer layers will be under any great amount of tension or the inner layers under great compression and in which the property or ability of elongation per unit of length of the metal in the various layers decreases from the core-tube outward to the outside of the gun in such a manner as to give practically a uniform ability to withstand internal stress by all the layers or rings. Inasmuch as neither the jackets nor hoops are under any appreciable amount of tension, they are each capable of receiving an equal amount of stress, and the stress which they are capable of withstanding is nearly equal to their limit of elasticity, whereas in the old form of gun the inner hoop or jacket could receive a stress only equal to its limit of elasticity minus the enormous initial stress under which it was placed, and the other hoops could receive less and less stress from the inside one out. It will be readily observed that the jacket and hoops in my gun can be made much thinner than in the old form of gun, or, if made of the same thickness, the gun will be capable of withstanding a much higher pressure than guns made according to the old method. As above stated, the property or ability of elongation of the various layers decreases toward the outside, and this decrease should be varied approximately as the square of the distance of the various layers from the center, so that all said layers will bear approximately a uniform stress per square inch of section when the gun or cylinder is subjected to internal pressure. The same principle is followed in the wire-wound gun shown in Fig. 2, in which the tube 15 possesses the property or ability of elongation to a certain degree, and each of the layers of wire 21 22 23 possesses this property or ability of elongation to a lesser degree than the core-tube 15 and each layer to a lesser degree than the preceding inner layer. The trunnion-jacket 18 in this type of gun is not usually depended upon to help in resisting the internal stress of the gun. Consequently the property or ability of elongation of the metal thereof is immaterial; but should it be desired to have this jacket assist in withstanding the internal stress of the gun it will of course be made of metal having the property or ability of elongation in a lesser degree than the outer layer of wire. The various layers of wire will be laid upon each other snugly and with only sufficient tension to hold them firmly in place.

The various layers comprising the gun may be made of metal having the same property or ability of elongation; but in that case the tensile strength of the metal would have to increase from the inside tube outward. The same effect will be obtained as in the other construction, for, although the various layers when subjected to the full stress they are capable of resisting would elongate an equal amount per unit of length, still when said layers are all subjected to a given or equal stress, as is the case in actual use, the ones composed of metal of higher tensile strength will elongate a lesser amount per unit of length than those having a lesser tensile strength. Consequently the former under a given stress have a less property or ability of elongation than the latter under the same stress.

It will be understood that it is not necessary to apply the foregoing principle to all the layers composing the walls of the gun or cylinder, and especially if such walls are composed of a large number of layers. It may be sufficient if two or more of the layers, tubes, or jackets are constructed on this principle, and the two or more layers, tubes, or jackets need not necessarily lie one over the other, but may be separated by one or more layers, tubes, or jackets in which the degree of elongation has been ignored. In gun construction especially it may be desirable to form the core-tube of metal best suited to withstand the friction of the shell and irrespective of its ability to elongate. So, too, the outside or trunnion bands should preferably be chosen without reference to their ability to elongate. All such modifications I consider within the scope of my invention as claimed.

The principle of my invention is of course applicable to any form of cylinder—such, for instance, as hydraulic cylinders, gas-cylinders, or the like—and these cylinders may be either built up of tubes or layers one over the other or of an internal tube wound with one or more layers of wire. In either case the cylinder will be so constructed that the stress will be divided among all the layers, so that each layer will bear substantially the same stress per square inch of section. Furthermore, the layers will be subject to only a very slight initial tension, so that the cylinder may be subjected to an internal pressure much greater than in the present make of built-up cylinders.

What I claim as my invention, and desire to secure by Letters Patent, is—

1. A cylinder of the character specified having walls composed of metal, the property or ability of elongation under a given stress of the metal in its normal condition in different concentric portions of the walls of said cylinder being different and decreasing from the inside outwardly.

2. A cylinder of the character specified composed of a series of layers or rings, two or more of said layers or rings being made of metal having different degrees of the property or ability to elongate under a given stress, said property or ability of elongation being greatest in the innermost one of said layers or rings and decreasing outwardly.

3. A cylinder of the character specified composed of a series of layers or rings, said layers or rings being made of metal having different degrees of the property or ability to elongate under a given stress, said ability or property of elongation being greatest in the innermost one of said layers or rings and decreasing outwardly.

4. A cylinder of the character specified composed of a series of layers or rings, two or more of said layers or rings being made of metal having different degrees of the property or ability to elongate under a given stress, said ability or property to elongate being greatest in said layer or ring nearest the bore and decreasing from said inner layer or ring to the outer one thereof.

5. A cylinder of the character specified having walls composed of metal, the property or ability of elongation under given stress of the metal in its normal condition in different concentric portions of the walls of said cylinder being different and decreasing from the inside outwardly approximately as the square of the distance from the center.

6. A cylinder of the character specified composed of a series of layers or rings, said layers or rings being made of metal having different degrees of the property or ability to elongate under a given stress, said property or ability of elongation being greatest in the innermost one of said layers or rings and decreasing outwardly approximately as the square of the distance from the center.

7. A cylinder of the character specified composed of a series of layers or rings, the property or ability of elongation under a given stress of the metal of two or more of said layers or rings being different in said layers or rings and decreasing from said inner layer or ring to the outer one thereof, said rings or layers being under an initial tension just sufficient to hold them in place.

In testimony whereof I, the said JACOB SCHINNELLER, have hereunto set my hand.

JACOB SCHINNELLER.

Witnesses:
ROBERT C. TOTTEN,
F. W. WINTER.